Dec. 2, 1969    D. C. MOLLOY    3,481,225
ADJUSTABLE CUTTING TOOLHOLDER
Filed Sept. 13, 1967
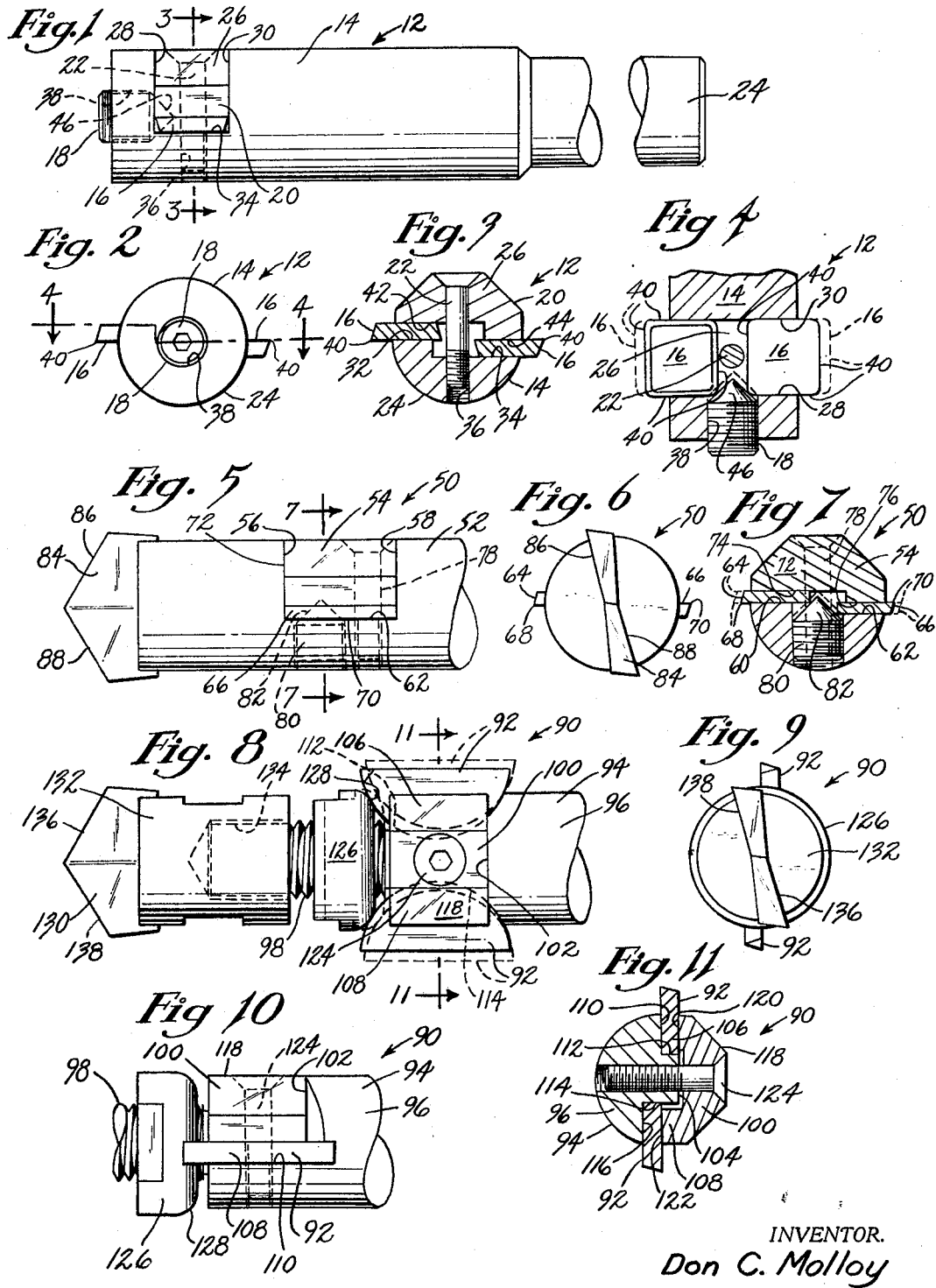
INVENTOR.
Don C. Molloy
BY
McCormick, Paulding & Huber
ATTORNEYS

United States Patent Office 3,481,225
Patented Dec. 2, 1969

3,481,225
ADJUSTABLE CUTTING TOOLHOLDER
Don C. Molloy, 104 Dover Road,
West Hartford, Conn. 06119
Filed Sept. 13, 1967, Ser. No. 667,554
Int. Cl. B23b 19/00, 31/04
U.S. Cl. 77—58    13 Claims

ABSTRACT OF THE DISCLOSURE

An adjustable cutting toolholder for a machine tool has an axially elongated body member supporting two cutter inserts held in clamping engagement therein by a clamp member and a single clamp screw. Controlled adjustment of the cutting toolholder is effected by a camming element or screw threadably engaging one of the members and cammingly engaging the inserts for simultaneously expanding them radially outwardly relative to the body member.

SUMMARY OF INVENTION

This invention relates in general to cutting toolholders and deals more particularly with improved boring and reaming tools of adjustable insert type. The general aim of the present invention is to provide an improved adjustable cutting toolholder of the aforedescribed type for economical manufacture. A further aim of the invention is to provide a cutting toolholder for drilling and boring or reaming a hole in a workpiece in a single machine operation.

In accordance with the present invention an adjustable toolholder is provided of simple durable construction having cutter inserts arranged for controlled expansion to a desired cutting diameter and to compensate for wear resulting from usage.

BRIEF DESCRIPTION OF THE DRAWINGS

FIG. 1 is an elevational view of a cutting toolholder embodying the present invention and shown with cutter inserts mounted therein.

FIG. 2 is a view of the left or forward end of the cutting toolholder shown in FIG. 1.

FIG. 3 is a sectional view taken along the line 3—3 of FIG. 1.

FIG. 4 is a fragmentary sectional view taken generally along the line 4—4 of FIG. 2, an expanded position of the cutter inserts being indicated by broken lines.

FIG. 5 is an elevational view of another cutting toolholder embodying the present invention.

FIG. 6 is a view of the left or forward end of the cutting toolholder shown in FIG. 5.

FIG. 7 is a sectional view taken along the line 7—7 of FIG. 5.

FIG. 8 is a fragmentary elevational view of still another cutting toolholder embodying the present invention.

FIG. 9 is a view of the left or forward end of the cutting toolholder shown in FIG. 8.

FIG. 10 is a fragmentary bottom view of the cutting toolholder of FIG. 8.

FIG. 11 is a sectional view taken along the line 11—11 of FIG. 8.

DESCRIPTION OF THE PREFERRED EMBODIMENTS

Referring now to the drawing and first considering FIGS. 1–4, a cutting toolholder embodying the present invention, and indicated generally at 12, comprises a support member or body 14 carrying a set of cutter inserts 16, 16 and a camming element or adjustment screw 18 for adjusting the position of the cutter inserts relative to the support member. A clamp member 20 secured to the support member by a single clamp screw 22 cooperates with the support member to releasably retain the inserts 16, 16 in a selected position of adjustment.

The body may be made in various forms but preferably the body 14 is an axially elongated generally cylindrical member having a coaxially rearwardly extending cylindrical shank 24 for supporting the cutting toolholder 12 in the spindle of a machine tool or the like (not shown) for rotation relative to the workpiece. Near its forward or working end the body 14 is provided with a transversely extending radially outwardly opening recess or notch 26. The notch has parallel spaced apart end walls 28 and 30 and a stepped bottom wall which includes a first bearing surface 32 generally disposed in an axial plane of the body 14 and a second bearing surface 34 parallel to the first bearing surface and spaced therefrom a distance approximately equal to the thickness of an insert 16, as best shown in FIG. 3. A threaded opening 36 for receiving the clamping screw 22 extends radially through the body 14 and opens through the bearing surface 34 near the center of the notch. Another threaded opening 38 for accommodating the adjustment screw 18 extends coaxially through the forward end of the body to communicate with the notch 26.

Two standard cutter inserts formed of carbide or the like material are preferably used to practice the invention. Each cutter insert 16 is generally square and slightly rounded at its corners and has four cutting edges 40, 40 disposed in a common plane, and a generally trapezoidal cross section as best shown in FIG. 3. The width of each insert is substantially equal to the axial length of the notch 26 so that each insert may be positioned in the notch with any one of its four cutting edges in general parallel alignment with the body axis. Each insert 16 rests on an associated one of the bearing surfaces 32 and 34 the two inserts being so arranged that their cutting edges 40, 40 lie within the same axial plane.

The clamp member 20 is received in and substantially fills the notch and has a radially inwardly facing stepped wall which includes parallel and spaced apart clamping surfaces 42 and 44. The spacing between the latter clamping surfaces is substantially equal to the thickness of a cutter insert so that each clamping surface rests on an associated one of the inserts. It should also be noted that the inwardly facing wall of the clamp member 20 is spaced from the bottom wall of the notch 26 in the area between the inserts 16, 16 to provide clearance therebetween so that all clamping force exerted by the clamp member 20 is applied to the inserts. The clamp screw 22 extends radially through the clamp member and between the inserts 16, 16 threadably engaging the support member in the opening 36 to draw the latter two members into clamping engagement with the cutter inserts.

Controlled adjustment of the cutter inserts to expand them to a desired cutting diameter and to compensate for insert wear is effected by the adjustment screw 18. At its inner end this adjustment screw has a conical portion or camming surface 46 for engaging each of the inserts. It will be noted that the camming surface 46 engages a cutting edge 40 on each insert, as best shown in FIG. 4, and for this reason it is preferable that at least the conical portion of this screw 18 be made of a material which is at least as hard and preferably harder than the material from which the inserts are made. Thus the conical portion 46 is or may be made of carbide or like material welded or otherwise suitably joined to the body of the screw 18. Since the conical portion 46 engages the inserts in the same axial plane, adjustment of the screw 18 relative to the body 14 and toward the inserts 16, 16 uniformly expands or drives the inserts radially outwardly toward positions of maximum expansion indicated generally by broken lines in FIG. 4. The boring operation is preformed by the forward corners of the cutter inserts 16, 16 whereas the cutting edges 42, 42 perform the reaming operation.

In FIGS. 5–7 another cutting toolholder embodying the present invention is illustrated and indicated generally at 50. The toolholder 50 is similar in some respects to the previously described toolholder 12, and like the latter toolholder includes an axially elongated generally cylindrical support member or body 52 provided with a transversely extending radially outwardly opening recess or notch 54 near its forward end. The notch has spaced apart front and rear walls respectively indicated at 56 and 58. The bottom wall of the notch is stepped and is formed by a first bearing surface 60 disposed within the axial plane of the body and a second bearing surface 62 parallel to the surface 60 and spaced therefrom a distance substantially equal to the thickness of a cutter insert. The cutter inserts used with the toolholder 50 are generally rectangular and of equal thickness but unequal width. Inserts indicated at 64 and 66 and having cutting edges 68 and 70 are received within the notch 54 and respectively rest on the bearing surfaces 60 and 62. The inserts 64 and 66 are arranged in the notch 54 so that the cutting edges 68 and 70 lie within an axial plane of the body 50.

To hold the cutter inserts in the body 52 a clamp member 72 generally similar to the previously described clamp member 20 is received within the notch 54 and includes inwardly facing clamping surfaces 74 and 76 which respectively bear against the inserts 64 and 66. A clamp screw 78 passing through the rear portion of the clamp member 72 threadably engages the support member or body 52 to draw the latter two members into clamping engagement with the cutter inserts.

Like the toolholder of the previously described embodiment the toolholder 50 includes a camming element or adjustment screw 80 which threadably engages the body 52 and extends radially inwardly therethrough. The axis of the screw 80 is generally normal to the plane of the cutting edges 68 and 70 and at its inner end the screw includes a conical portion or camming surface 82 for engaging an inner edge on each of the cutter inserts 64 and 66. Referring to FIG. 7 it will be noted that the inner edges of the inserts 64 and 66 engage the conical camming surface 82 in different diametric planes, and it is for this reason that the two inserts are not of the same width. A set of cutters having different widths may be provided, as shown, however, preferably the toolholder 50 is assembled with substantially identical cutter inserts therein which are thereafter altered by grinding so that their cutting edges 68 and 70 are circumferentially aligned. To effect a desired change in the boring diameter of the tool or to compensate for insert wear the screw 80 is threaded toward the inserts 64 and 66 thereby uniformly expanding or driving the inserts radially outwardly toward positions of maximum expansion indicated by broken lines in FIG. 7.

The toolholder 50 may also be employed to drill and counterbore and/or ream a hole in a workpiece in a single operation and it is for this purpose that the toolholder is provided with an additional blade 84 at its forward end. The blade 84 is welded or otherwise suitably attached to the body 52 and includes cutting edges 86 and 88 disposed at an angle to each other so that the cutting tool 50 may serve as a drill when rotated relative to a workpiece. The diameter of the blade 84 is slightly smaller than the minimum adjusted diameter of the cutter inserts 64 and 66 so that the cutter inserts counterbore and/or ream the hole drilled by the blade 86.

A further embodiment of the invention shown in FIGS. 8–11 and indicated generally at 90 is particularly adapted for supporting a set of substantially identical relatively thin generally circular cutter inserts such as indicated at 92, 92. The toolholder 90 generally comprises an axially elongated support member or body 94 including a generally cylindrical portion 96 which has an externally threaded stem 98 of somewhat smaller diameter extending coaxially forwardly therefrom. At its forward end the body portion 96 has a forwardly and radially outwardly opening clamp receiving recess 100 defined by a forwardly facing end wall 102 and a generally axially disposed bottom wall 104 spaced from the axis of the support member. Insert receiving recesses 106 and 108 are respectively formed in the body portion 96 on either side of the clamp receiving recess 100 and communicate therewith. The insert receiving recess 106 has a bottom wall 110 which lies generally within an axial plane and an arcuately shaped inner wall 112 generally normal to the bottom wall 110 and having a radius of curvature substantially equal to the radius of curvature of an associated cutter insert 92. The insert receiving recess 108 is similarly formed and includes an arcuately shaped inner wall 114 and a bottom wall 116 disposed on the opposite side of the body axis from the wall 104 parallel to the bottom wall 110 and spaced therefrom a distance substantially equal to the thickness of a cutter insert 92.

A clamp member 118 generally similar to the clamp members of the previously described embodiments is received within the clamping recess 100 and extends therefrom into the insert receiving recesses 106 and 108. The clamp member 118 includes bearing surfaces 120 and 122 respectively engaging the cutter inserts 92, 92. A single clamp screw 124 extending centrally through the clamp member threadably engages the body portion 96 to draw the clamp member and the support member into clamping engagement with the cutter inserts in a manner as generally aforedescribed.

Adjustment of the cutter inserts relative to the support member is effected by a camming element or nut 126 which threadably engages the stem 98. The nut 126 is generally cylindrical and includes a generally and rearwardly facing camming surface 128 for engaging the arcuate edges of the cutter inserts 92, 92 in a manner best shown in FIG. 8. As the nut 126 is threaded rearwardly on the stem 98 and toward the inserts 92, 92 the camming surface 128 engages associate arcuate portions of the cutter inserts 92, 92 to urge the inserts radially outwardly toward positions of maximum expansion generally indicated by broken lines in FIG. 8. Reasonably uniform accurate adjustment of the cutter inserts is effected in this manner, however, after the inserts have been adjusted it is preferable that they be dressed by grinding before being put into service.

A toolholder made in the aforedescribed manner may be used for boring and/or reaming a hole in a workpiece, however, in some instances it may be desirable to employ the tool to drill the pilot hole which it finishes. For this reason provision is made to releasably retain an additional cutting blade to the forward end of the toolholder 90. Such a cutting blade indicated at 130 and is carried by a generally cylindrical attaching member 132. The attaching member has a rearwardly opening internally threaded hole 134 for receiving the forward end of the stem 98 as shown in FIG. 8. The blade 130 is welded or otherwise suitably secured to the attaching member 132 and includes cutting edges 136 and 138 disposed at an angle to each other so that the blade 130 acts as a drill when rotated relative to the workpiece.

The drawing shows preferred embodiments of the invention and such embodiments have been described, but it will be understood that various changes may be made from the construction disclosed and that the drawing and description are not to be construed as defining or limiting the scope of the invention, the claims forming a part of this specification being relied upon for that purpose.

I claim:

1. An adjustable cutting toolholder for a pair of cutter inserts comprising an axially elongated support member having a radially outwardly opening recess therein including a generally radially disposed forwardly facing end wall and an outwardly facing stepped bottom wall having a first bearing surface generally disposed in an axial plane for supporting one of said inserts and a second bearing surface parallel thereto and spaced therefrom a distance substantially equal to the thickness of the other of said inserts for supporting said other insert, a clamp member received in said recess forwardly of said end wall and having a stepped inwardly facing wall including a first clamping surface for engaging said one insert and a second clamping surface parallel thereto and spaced therefrom a distance substantially equal to the thickness of said one insert for engaging said other insert, means for simultaneously moving said inserts radially outwardly in diverse directions relative to said support member, and a clamp screw extending through one said member and between said inserts and threadably engaging the other said member for drawing the two members into clamping engagement with said inserts.

2. An adjustable cutting tool as set forth in claim 1 wherein said adjusting means comprise a camming element threadably engaging one of said members and cammingly engaging said inserts.

3. An adjustable cutting tool as set forth in claim 2 wherein said camming element comprises an adjustment screw having a conical camming surface.

4. An adjustable boring tool as set forth in claim 3 wherein said adjustment screw extends radially inwardly of said one member.

5. An adjustable boring tool as set forth in claim 3 wherein said adjustment screw extends coaxially inwardly of said one member.

6. An adjustable cutting tool as set forth in claim 2 further characterized by said camming element comprising a nut threadably received on said support member.

7. An adjustable cutting tool as set forth in claim 6 further characterized by said support member having an externally threaded stem coaxially projecting therefrom, said nut being received on said stem, and a generally axially forwardly projecting blade having at least one cutting edge at the forward end thereof, said blade being threadably received on said stem.

8. An adjustable cutting toolholder as set forth in claim 2 wherein at least a portion of said camming element is made of material at least as hard as the material from which the inserts are made and said camming element portion engages a cutting edge on each of said inserts.

9. An adjustable cutting tool as set forth in claim 1 further characterized by a generally axially forwardly projecting blade carried by said support member and having at least one cutting edge at the forward end thereof, each said insert cutting edge being spaced axially rearwardly of and radially outwardly from said blade cutting edge.

10. An adjustable cutting tool as set forth in claim 9 further characterized by means for releasably retaining said blade on said support member.

11. An adjustable cutting toolholder as set forth in claim 1 wherein said support member includes a generally cylindrical shank portion extending coaxially rearwardly from said end wall.

12. An adjustable cutting toolholder as set forth in claim 1 wherein said inwardly facing wall is spaced from said bottom wall in the area between said inserts.

13. An adjustable cutting toolholder as set forth in claim 1 wherein said recess includes a generally radially disposed rearwardly facing end wall axially spaced from said forwardly facing end wall a distance substantially equal to the width of said inserts.

References Cited
UNITED STATES PATENTS

| | | | |
|---|---|---|---|
| 341,766 | 5/1886 | Otto | 77—58.31 |
| 457,536 | 8/1891 | Jennings | 77—58.32 |
| 1,022,038 | 4/1912 | Meitz | 77—58.32 |
| 1,385,370 | 7/1921 | Fox | 77—58.3 |
| 1,442,804 | 1/1923 | Hicks | 77—58.31 |
| 2,630,726 | 3/1953 | Trocki | 77—58.32 |
| 3,189,976 | 6/1965 | Pickril | 77—58.32 |

GERALD A. DOST, Primary Examiner

U.S. Cl. X.R.

77—75